United States Patent
Haraguchi et al.

(10) Patent No.: US 10,086,850 B2
(45) Date of Patent: Oct. 2, 2018

(54) AIR SPRING

(71) Applicants: Sumitomo Electric Industries, Ltd., Osaka-shi, Osaka (JP); KAWASAKI JUKOGYO KABUSHIKI KAISHA, Kobe-shi, Hyogo (JP)

(72) Inventors: Hirokazu Haraguchi, Osaka (JP); Takehiro Nishimura, Kobe (JP); Yasufumi Okumura, Kobe (JP)

(73) Assignees: SUMITOMO ELECTRIC INDUSTRIES, LTD., Osaka-shi, Osaka (JP); KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 2 days.

(21) Appl. No.: 15/124,133

(22) PCT Filed: Mar. 12, 2015

(86) PCT No.: PCT/JP2015/057355
§ 371 (c)(1),
(2) Date: Sep. 7, 2016

(87) PCT Pub. No.: WO2015/137460
PCT Pub. Date: Sep. 17, 2015

(65) Prior Publication Data
US 2017/0015334 A1    Jan. 19, 2017

(30) Foreign Application Priority Data
Mar. 14, 2014 (JP) .................................. 2014-051762

(51) Int. Cl.
*F16F 9/05* (2006.01)
*B61F 5/10* (2006.01)
(Continued)

(52) U.S. Cl.
CPC .................. *B61F 5/10* (2013.01); *F16F 9/05* (2013.01); *F16F 9/437* (2013.01); *F16F 9/50* (2013.01);
(Continued)

(58) Field of Classification Search
CPC ...... F16F 9/05; F16F 9/437; F16F 9/50; F16F 13/002; F16F 2230/24; F16F 2230/08
(Continued)

(56) References Cited

U.S. PATENT DOCUMENTS 4,778,156 A * 10/1988 Imaizumi ............... B60G 15/12
                                                        267/64.21
5,649,692 A *  7/1997 Gilsdorf ................. B60G 11/26
                                                        267/64.21
(Continued)

FOREIGN PATENT DOCUMENTS

CN          1365322 A      8/2002
JP         H11-78877 A     3/1999
(Continued)

*Primary Examiner* — Thomas W Irvin
(74) *Attorney, Agent, or Firm* — Drinker Biddle & Reath LLP (57) ABSTRACT

Included are: a first supporting member; a second supporting member arranged to be spaced away from the first supporting member in a main load direction; an elastically deformable diaphragm forming a closed space by connecting the first supporting member and the second supporting member; a detection unit detecting a change of a relative distance between the first supporting member and the second supporting member, and producing a mechanical output of the change of the relative distance; and a controlling member capable of discharging air in an inside of the closed space S to an outside of the closed space S in response to the mechanical output from the detection unit. Thereby, an air spring having a mechanism for suppressing an abnormal rise
(Continued)

of a vehicle height without deteriorating the diaphragm can be provided.

5 Claims, 7 Drawing Sheets

(51) Int. Cl.
*F16F 9/50* (2006.01)
*F16F 13/00* (2006.01)
*F16F 9/43* (2006.01)

(52) U.S. Cl.
CPC ........ *F16F 13/002* (2013.01); *F16F 2230/24* (2013.01)

(58) Field of Classification Search
USPC .......................... 267/35, 64.21, 64.24, 64.27
See application file for complete search history.

(56) References Cited

U.S. PATENT DOCUMENTS

| | | | | |
|---|---|---|---|---|
| 5,859,692 A * | 1/1999 | Ross, Jr. | .......... | B60G 17/01933 267/64.19 |
| 5,921,532 A * | 7/1999 | Pierce | ...................... | B60G 7/04 267/64.19 |
| 6,375,168 B2 * | 4/2002 | Behrends | .................. | F16F 9/05 267/64.19 |
| 6,644,632 B1 * | 11/2003 | Jaberg | .................... | B60G 11/28 267/64.21 |
| 7,420,462 B2 * | 9/2008 | Nordmeyer | ...... | B60G 17/01933 340/438 |
| 8,540,220 B2 * | 9/2013 | Sawa | ........................ | B61F 5/10 267/3 |
| 8,585,025 B2 * | 11/2013 | Lee | ........................ | B60G 11/27 267/64.15 |
| 8,915,508 B2 * | 12/2014 | May | ...................... | F16F 9/3292 267/64.19 |
| 9,308,796 B2 * | 4/2016 | Leonard | ................ | B60G 15/12 |
| 9,545,933 B2 * | 1/2017 | Nishimura | ................ | B61F 5/10 |
| 9,636,963 B2 * | 5/2017 | Smith | .................... | B60G 11/62 |
| 2002/0158381 A1 | 10/2002 | Foerster et al. | | |
| 2013/0313764 A1 * | 11/2013 | Fujimoto | .................. | B61F 5/02 267/64.27 |
| 2014/0230687 A1 * | 8/2014 | Jackson, Jr. | .............. | B61F 5/10 105/198.1 |
| 2014/0239606 A1 * | 8/2014 | Koeske | .................. | F16F 9/057 280/124.16 |
| 2016/0195151 A1 * | 7/2016 | Prams | .................. | B60G 17/019 267/64.27 |
| 2016/0236532 A1 * | 8/2016 | Moulik | ...................... | F16F 9/05 |
| 2016/0252153 A1 * | 9/2016 | Haraguchi | ................ | B61F 5/10 267/64.27 |
| 2016/0264155 A1 * | 9/2016 | Kamura | .................... | B61F 5/10 |
| 2017/0204929 A1 * | 7/2017 | Hart | ........................ | F16F 9/05 |

FOREIGN PATENT DOCUMENTS

| | | |
|---|---|---|
| JP | 2005-161879 A | 6/2005 |
| JP | 2008-80852 A | 4/2008 |
| JP | 2013-220685 A | 10/2013 |

\* cited by examiner

AIR SPRING

TECHNICAL FIELD

The present invention relates to an air spring, and particularly to an air spring capable of suppressing an abnormal rise of a vehicle body of a railroad vehicle.

BACKGROUND ART

In a railroad vehicle, an air spring is arranged between a vehicle main body and a carriage in order to reduce impacts and vibrations applied to a vehicle body during traveling of the vehicle. The air spring mainly includes: an upper surface plate connected to the vehicle main body; a lower surface plate arranged below the upper surface plate; a diaphragm made of rubber and arranged so as to connect the upper surface plate and the lower surface plate; and the like. The diaphragm is elastically deformed, so that impacts and vibrations applied in the upward and downward directions during traveling of the vehicle can be reduced.

The air spring has an air supply/discharge valve (leveling valve) for supplying/discharging pressurized air into/from the air spring. The air supply/discharge valve has a dead band, and is controlled to be closed in a normal case (in the case where impacts and vibrations are not relatively large). In this case, the air spring acts to reduce the impacts and vibrations applied to the vehicle by elastic deformation of the diaphragm as described above. On the other hand, for example, when the payload applied to the vehicle is increased to thereby lower the vehicle height, or when the centrifugal force generated during turning traveling of the vehicle acts to lower the vehicle height at a distal portion of the vehicle relative to a center of the turning traveling, the air supply/discharge valve (leveling valve) is opened to supply the pressurized air within an air reservoir into the air spring. Thereby, the height of the upper surface plate can be raised relative to the lower surface plate. In this way, the vehicle height can be controlled to be set at a prescribed height by controlling the amount of pressurized air to be supplied into the air spring.

The railroad vehicle is generally provided with a fail safe function in preparation for the case where the air supply/discharge function is not normally performed.

For example, in the case where the fail safe function is implemented using a sensor detecting a change of the vehicle height (electrical processing) and an air-discharge solenoid valve for discharging air in response to a detection signal from the sensor, there occur problems that the structure and the system of the air spring become complicated.

In consideration of the above-described problems, Japanese Patent Laying-Open No. 11-78877 discloses, as a mechanism for preventing excessive supply of pressurized air into the air spring, an air spring apparatus for supporting vehicle body configured in such a manner that air inside the air spring can be discharged by causing an arm to directly contact a diaphragm while air is being excessively supplied.

CITATION LIST

Patent Document

PTD 1: Japanese Patent Laying-Open No. 11-78877

SUMMARY OF INVENTION

Technical Problem

According to the air spring apparatus for supporting vehicle body disclosed in Japanese Patent Laying-Open No. 11-78877, however, a member (arm) for detecting a change in vehicle height is provided so as to directly contact the diaphragm. Such a direct contact may cause deterioration of the diaphragm, so that the maintenance may become complicated.

The present invention has been made to solve the above-described problems. A main object of the present invention is to provide an air spring including a mechanism for suppressing an abnormal rise of the vehicle height without deteriorating a diaphragm.

Solution to Problem

An air spring includes: a first supporting member; a second supporting member arranged to be spaced away from the first supporting member in a main load direction; an elastically deformable diaphragm forming a closed space by connecting the first supporting member and the second supporting member; a detection unit detecting a change of a relative distance between the first supporting member and the second supporting member, and producing a mechanical output of the change of the relative distance; and a controlling member capable of discharging air in an inside of the closed space to an outside of the closed space in response to the mechanical output from the detection unit.

Advantageous Effects of Invention

According to the present invention, it becomes possible to provide an air spring including a mechanism for suppressing an abnormal rise of the vehicle height without deteriorating a diaphragm.

DESCRIPTION OF EMBODIMENTS

An air spring according to embodiments will be hereinafter described with reference to the accompanying drawings, in which the same or corresponding components are designated by the same reference characters, and description thereof will not be repeated.

Description of Embodiments of the Invention of the Present Application

First, the outline of the embodiment of the present invention will be hereinafter listed.

(1) An air spring according to the present embodiment includes: a first supporting member (an upper surface plate 10); a second supporting member (a lower surface plate 20, a rubber lower plate 30) arranged to be spaced away from the first supporting member (10) in a main load direction; an elastically deformable diaphragm 50 forming a closed space S by connecting the first supporting member (10) and the second supporting member (20, 30); a detection unit (a wire 61 and the like) detecting a change of a relative distance between the first supporting member (10) and the second supporting member (20, 30), and producing a mechanical output of the change of the relative distance; and a controlling member (an air discharge member 70) capable of discharging air in an inside of closed space S to the outside of closed space S in response to the mechanical output from the detection unit.

By the configuration as described above, in the case where the first supporting member (10) rises abnormally (exceeding a prescribed allowable range) relative to the second supporting member (20, 30), this abnormal rise can be detected by the detection unit (wire 61 and the like) when the change of the relative distance between the first supporting member (10) and the second supporting member (20, 30) exceeds the prescribed allowable range. At this time, the mechanical output for discharging the air in the inside of closed space S to the outside thereof is transmitted from the detection unit to the controlling member (70), so that the air can be discharged from closed space S. Accordingly, the change of the relative distance between the first supporting member (10) and the second supporting member (20, 30) can be returned to fall within the prescribed allowable range. Thereby, the first supporting member (10) can be suppressed from abnormally rising relative to the second supporting member (20, 30), with the result that an abnormal rise of the height of a vehicle placed on the first supporting member (10) can be suppressed.

Furthermore, the detection unit (wire 61 and the like) detects a change of the relative distance between the first supporting member (10) and the second supporting member (20, 30). Accordingly, the detection unit (wire 61 and the like) does not directly contact diaphragm 50, so that diaphragm 50 may not be deteriorated. Furthermore, the detection unit is configured to detect the abnormal height of the vehicle placed on the first supporting member (10) based on the change of the relative distance between the first supporting member (10) and the second supporting member (20, 30). Therefore, the detection unit can more directly detect an abnormal height of the vehicle.

Furthermore, since the air spring according to the present embodiment allows the air to be discharged from closed space S in response to the mechanical output, the air spring is simpler in structure and system than the conventional air spring including an air discharging system employing electrical processing.

(2) In the air spring according to the present embodiment, the detection unit includes a wire 61 that is routed between the first supporting member (10) and the second supporting member (20, 30). The mechanical output may correspond to a displacement of one end of wire 61.

In other words, when the first supporting member (10) rises abnormally (exceeding a prescribed allowable range) relative to the second supporting member (20, 30), wire 61 routed between the first supporting member (10) and the second supporting member (20, 30) is provided such that its one end undergoes a prescribed displacement. This displacement is transmitted as a mechanical output from the detection unit (wire 61 and the like) to the controlling member (70). Specifically, this displacement of wire 61 is transmitted as a mechanical output by a prescribed mechanical structure to the controlling member (70) connected to the detection unit. The controlling member (70) is configured to discharge the air in the inside of closed space S to the outside thereof when the mechanical output is equal to or greater than a prescribed magnitude. Thereby, when one end of wire 61 undergoes a displacement due to the above-described abnormality, this displacement of wire 61 is transmitted to the controlling member (70) as a mechanical output at which air in the inside of closed space S can be discharged to the outside thereof. Consequently, the air in closed space S can be discharged. In addition, in the case where the rise of the first supporting member (10) relative to the second supporting member (20, 30) falls within an allowable range, wire 61 may be configured such that its one end does not undergo a displacement, or wire 61 may be configured such that this displacement does not produce a mechanical output required for the air discharging operation of the controlling member (70). In addition, wire 61 may be configured such that its one end undergoes a displacement, for example, at the time when prescribed tension is applied to wire 61. In this case, the above-described mechanical output is provided according to the tension of wire 61.

Furthermore, by the configuration as described above, also when the first supporting member (10) moves greatly in the main load direction and in a direction perpendicular to the main load direction (for example, in the horizontal direction) relative to the second supporting member (20, 30), the abnormal rise of the first supporting member (10) is detected by adjusting the routing manner of wire 61, and can be transmitted as a mechanical output to the controlling member (70).

(3) In the air spring according to the present embodiment, the controlling member (70) may include: a through hole 71 allowing communication between the inside and the outside of closed space S; and an opening/closing member 72 capable of opening and closing through hole 71.

By the configuration as described above, the controlling member (70) having received the mechanical output from the detection unit opens through hole 71 closed by opening/closing member 72, so that the air in the inside of closed space S can be discharged to the outside of closed space S.

(4) In the air spring according to the present embodiment, opening/closing member 72 may have a plug member 73 configured to be movable relative to through hole 71 by the mechanical output.

By the configuration as described above, plug member 73 is provided in opening/closing member 72 so as to be relatively movable by the mechanical output, so that the operation for opening and closing through hole 71 can be performed in response to the mechanical output. Furthermore, since the air in closed space S can be discharged in response to the mechanical output, the air spring according to the present embodiment is simpler in structure and system than the conventional air spring including an air discharging system employing electrical processing.

(5) In the air spring according to the present embodiment, plug member 73 has a first tapered portion (an outer circumferential surface portion 73a) formed in a tapered shape. Also, the inner circumferential surface of through hole 71 may have a second tapered portion (an inner circumferential surface portion 71a) that is in surface contact with the first tapered portion (73a) of plug member 73 in the state where opening/closing member 72 is closed.

By the configuration as described above, through hole 71 can be opened and closed by a slight movement of plug member 73 in the hole axis direction of through hole 71, so that the opening/closing operation can be quickly performed. Furthermore, through hole 71 and plug member 73 can be readily positioned coaxially with each other during the opening/closing operation.

(6) In the air spring according to the present embodiment, a second supporting member (20, 30) includes an elastic member (a rubber stack 40), and the controlling member (70) may be embedded in the elastic member (40).

The controlling member (70) needs to be placed in a boundary region demarcating the inside of closed space S from the outside thereof. Accordingly, in the air spring having the same structure as that of the existing air spring, the region in which the controlling member (70) can be placed is limited. In other words, by placing the controlling member (70) in a region included in the second supporting member (20, 30), the air spring according to the present embodiment can be configured without requiring a significant design change based on the premise of the air spring having basically the same structure as that of the existing air spring.

Details of Embodiments of the Invention of the Present Application

Then, the details of embodiments of the present invention will be hereinafter described.

Figure 1:
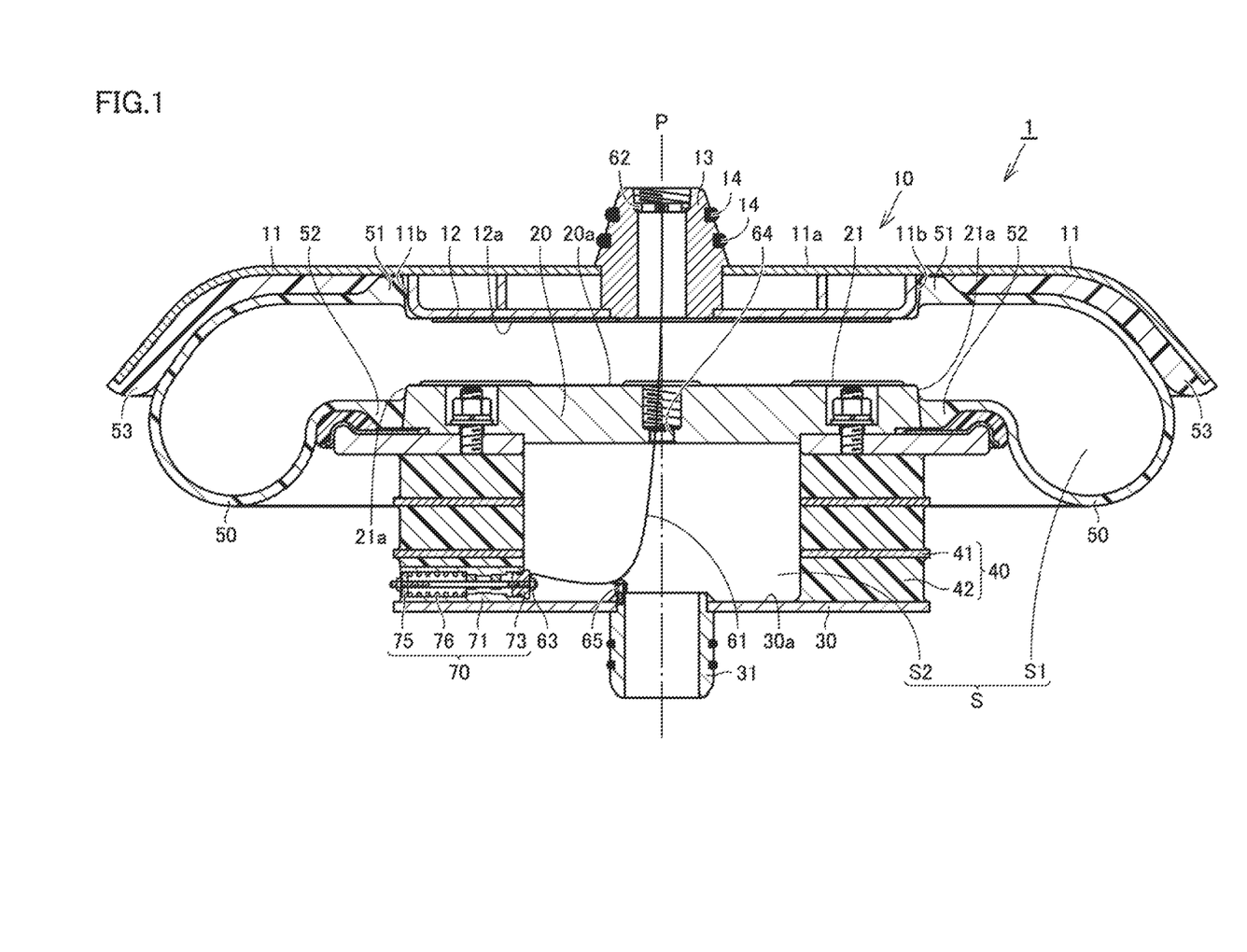
FIG. 1 is a cross-sectional view of an air spring according to the first embodiment.

Referring to FIG. 1, an air spring according to the present embodiment will be hereinafter described. An air spring 1 of the present embodiment mainly includes: an upper surface plate 10 as a first supporting member (10); a lower surface plate 20 and a rubber lower plate 30 as a second supporting member (20, 30); a rubber stack 40; and a diaphragm 50. Upper surface plate 10, lower surface plate 20, and diaphragm 50 form a space S1.

Upper surface plate 10 mainly has a support plate 11 as the first supporting body, and a slide member 12 as the second supporting body. Support plate 11 is formed, for example, in a circular shape having its center on an axis line (central axis) P as seen from above an upper surface 11a. Support plate 11 is provided so as to face lower surface plate 20 in the center portion including axis line P, and to cover at least a part of diaphragm 50 in the outer circumferential portion (radially outside).

Slide member 12 is formed as a protruding portion having a circular base shape protruding from support plate 11 toward lower surface plate 20. Main surface 12a of slide member 12 that faces lower surface plate 20 is reduced in coefficient of friction. Slide member 12 is located so as to face slide member 21 provided on a main surface 20a of lower surface plate 20 described later. Slide member 12 is, for example, made of stainless steel (SUS).

A vehicle body side spigot 13 is attached in a region of upper surface plate 10 that includes axis line P. This vehicle body side spigot 13 protrudes along axis line P to the side opposite to lower surface plate 20. An O ring 14 is attached to the outer circumferential portion of vehicle body side spigot 13. Upper surface plate 10 is connected to the vehicle body side (not shown) through vehicle body side spigot 13.

The shape of upper surface 11a of support plate 11 as seen from above is not limited to a circular shape, but for example may have a rectangular shape, or may have a petal shape or a shape formed such that a part of the outer circumferential portion protrudes in the radial direction.

Lower surface plate 20 is arranged to be spaced away from upper surface plate 10 on the lower side in the main load direction so as to share axis line P with upper surface plate 10. Slide member 21 made, for example, of PTFE (fluorine-based resin) is arranged on main surface 20a of lower surface plate 20 that faces upper surface plate 10. Lower surface plate 20 is provided with a circumferential surface 21a that extends along axis line P in the same manner as circumferential surface 11b of upper surface plate 10.

Diaphragm 50 forms closed space S by connecting upper surface plate 10 and lower surface plate 20. Diaphragm 50 is, for example, made of rubber and can be elastically deformed. Diaphragm 50 is provided with an opening on its inner circumferential side and formed in an annular cylindrical shape having its center on axis line P. Diaphragm 50 is connected to upper surface plate 10 at an upper surface plate contact portion 51 defining one opening. Diaphragm 50 is connected to lower surface plate 20 at a lower surface plate contact portion 52 defining the other opening. Thereby, upper surface plate 10, lower surface plate 20, and diaphragm 50 form a space S1. Furthermore, diaphragm 50 is provided with a buffer portion 53 for preventing contact between diaphragm 50 and support plate 11. This buffer portion 53 is provided in a region of diaphragm 50 that is adjacent to a bent portion of support plate 11 that is bent downward in the main load direction so as to extend along the outer shape of diaphragm 50.

Rubber stack 40 is arranged on the side opposite to upper surface plate 10 relative to lower surface plate 20. Rubber stack 40 includes a plurality of hard layers 41 each made of metal or the like and a plurality of elastic layers 42 each made of rubber or the like. For example, rubber stack 40 has a structure in which hard layers 41 and elastic layers 42 are alternately stacked in the main load direction. Rubber stack 40 includes a plurality of elastic layers 42, so that it can be elastically deformed.

Rubber lower plate 30 is arranged below rubber stack 40 so as to share axis line P with upper surface plate 10 and lower surface plate 20. Specifically, rubber lower plate 30 is connected to lower surface plate 20 with rubber stack 40 interposed therebetween. A carriage side spigot 31 is formed in rubber lower plate 30 in the vicinity of axis line P. This carriage side spigot 31 protrudes along axis line P to the side opposite to rubber stack 40. In other words, carriage side spigot 31 formed as a small-diameter portion protruding along axis line P as a central axis is attached to rubber lower plate 30. Rubber lower plate 30 is connected to the carriage (not shown) side through carriage side spigot 31. Lower surface plate 20, rubber lower plate 30 and rubber stack 40 form a space S2. Space S1 and space S2 described above are connected through a lower surface plate through portion 64 provided in lower surface plate 20, thereby forming one closed space S inside the air spring. Also, air spring 1 is supplied with pressurized air through vehicle body side spigot 13 or carriage side spigot 31.

Wire 61 is routed between upper surface plate 10 and rubber lower plate 30. In this case, it is preferable that wire 61 is routed so as to pass through only an area in space S1 that is sandwiched between upper surface plate 10 and lower surface plate 20 (or rubber lower plate 30). Specifically, wire 61 has one end that is fixed to a fixing portion 62 provided on the inner circumferential side of vehicle body side spigot 13. Wire 61 has the other end that is positioned above rubber lower plate 30 and fixed by attachment 63 to an air discharge member 70 as a controlling member (70) embedded in rubber stack 40. Wire 61 is installed in an area from fixing part 62 to attachment 63 through lower surface plate through portion 64 provided in lower surface plate 20 and a wire routing member 65 provided in carriage side spigot 31. From a different point of view, wire 61 is installed between upper surface plate 10 and rubber lower plate 30 in the state where wire 61 is routed through space S1 and space S2 without contacting diaphragm 50. The length of wire 61 is adjusted such that tension is not applied to wire 61 in the case where the relative distance between upper surface plate 10 and rubber lower plate 30 falls within a range equal to or less than a prescribed value (the range of a normal function of air spring).

Lower surface plate through portion 64 is arranged in the center portion of lower surface plate 20 that includes axis line P in the state where upper surface plate 10 does not move relative to lower surface plate 20 in the radial direction. Wire routing member 65 is arranged on a surface of carriage side spigot 31 that comes in contact with space S2. Fixing part 62, lower surface plate through portion 64, and wire routing member 65 are arranged in the center portion including axis line P or in the vicinity thereof, and located along the main load direction as seen from fixing part 62.

Figure 2:
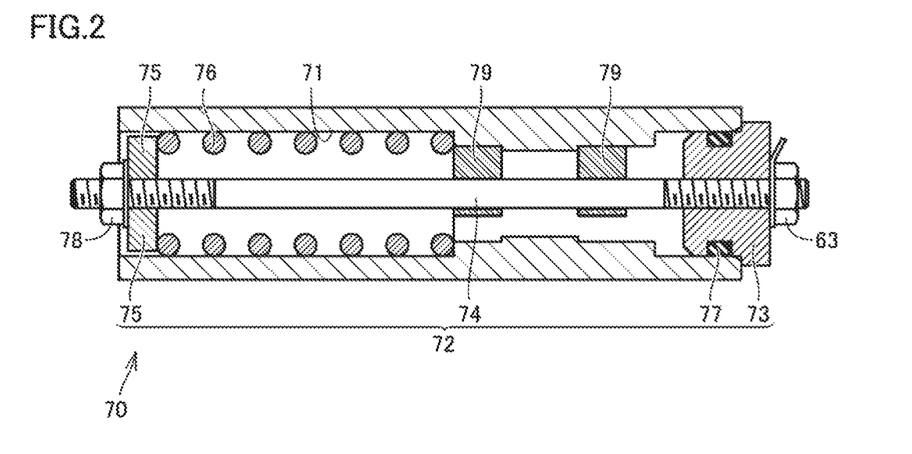
FIG. 2 is a cross-sectional view of an opening/closing member 72 according to the first embodiment.

Referring to FIG. 2, air discharge member 70 will be hereinafter described. This air discharge member 70 includes a through hole 71 allowing communication between the inside and the outside of diaphragm 50, and an opening/closing member 72 configured to be capable of opening and closing through hole 71. Opening/closing member 72 includes a plug member 73, a center shaft 74, a holding member 75, and a spring member 76.

Through hole 71 has a prescribed hole diameter. Through hole 71 has an inner space for example including: a region that can be in surface contact with plug member 73; and a region in which spring member 76 is housed and one end of spring member 76 can be fixed therein.

Plug member 73 is configured so as to be movable relative to through hole 71 by a mechanical output, and also to be capable of opening and closing through hole 71 at an end of through hole 71 that is located inside closed space S. Specifically, plug member 73 is fixed to center shaft 74 extending in the hole axis direction of through hole 71, and configured so as to be movable in the hole axis direction. Plug member 73 is made, for example, of SUS. The region of plug member 73 that comes in surface contact with the inner circumferential surface of through hole 71 may be provided along the hole axis direction of through hole 71. In this case, the inner circumferential surface of through hole 71 also may only be provided along the hole axis direction of through hole 71. A groove is provided in a region of plug member 73 that is in contact with the inner circumferential surface of through hole 71. An O ring 77 is provided inside this groove. O ring 77 is provided so as to fit in through hole 71.

Center shaft 74 is located inside through hole 71 along the hole axis of through hole 71. Center shaft 74 has one end fixed to attachment 63 and also fixed to plug member 73. Center shaft 74 has the other end fixed to holding member 75 of spring member 76. Center shaft 74 is made, for example, of SUS.

Holding member 75 of spring member 76 may only be fixed to center shaft 74 by any method, but may be fixed by a fixing nut 78, for example. Holding member 75 is configured so as to have a diameter smaller than the hole diameter of through hole 71, and also to have a diameter larger than the hole diameter of spring member 76 described later. Holding member 75 is made, for example, of SUS. In addition, when holding member 75 is formed in a petal shape or the like, the amount of compressed air to be discharged can be increased. Also, this petal shape can achieve an effect of generating a whistling noise during discharge of compressed air.

Spring member 76 is arranged inside through hole 71. Spring member 76 is formed in a cylindrical shape and provided inside through hole 71 so as to surround center shaft 74. Spring member 76 has: one end located on the plug member 73 side and fixed inside through hole 71; and the other end located inside through hole 71 and on the plug member 73 side of holding member 75 and contacting holding member 75. Spring member 76 is formed, for example, by a metal material wound in a spiral manner. The outer diameter of spring member 76 in the direction perpendicular to the hole axis of through hole 71 is smaller than the hole diameter of through hole 71. Furthermore, the inner diameter of spring member 76 is smaller than the diameter of holding member 75 and larger than the diameter of center shaft 74. Spring member 76 is configured so as to be capable of sufficiently firmly fixing plug member 73, and also to be compressible under the tension of wire 61.

A guide member 79 is provided inside through hole 71. This guide member 79 is connected to center shaft 74 for guiding this center shaft 74. Guide member 79 is provided so as not to prevent movement of center shaft 74 in the direction along the hole axis of through hole 71, and also to prevent movement of center shaft 74 in the direction displaced from the hole axis of through hole 71. Guide member 79 may be provided in one place, or may be provided in a plurality of places. Also, guide member 79 is formed in a petal shape in the same manner as with holding member 75, so that the amount of compressed air to be discharged can be increased. This petal shape can also achieve an effect of generating a whistling noise during discharge of compressed air. In addition, the discharge amount by air discharge member 70 is set to be greater than the amount of pressurized air to be supplied into closed space S by the air supply member.

Figure 3:
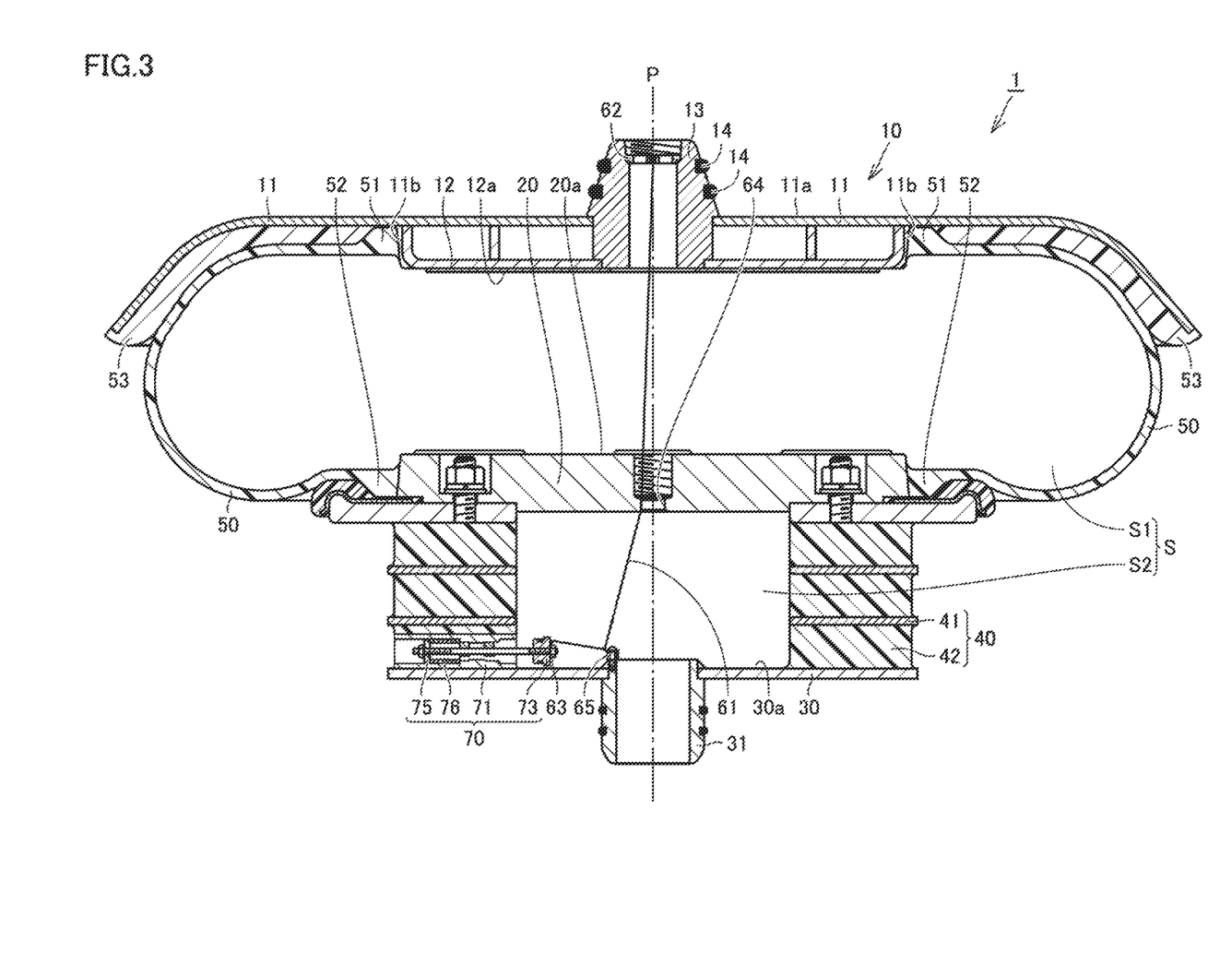
FIG. 3 is a cross-sectional view for illustrating the operation of the air spring according to the first embodiment.

Then, referring to FIGS. 1 to 3, the operation of air spring 1 according to the first embodiment will be hereinafter described. For example, when the vehicle undergoes shaking and impacts in the main load direction during traveling, diaphragm 50 is elastically deformed, thereby allowing air spring 1 to reduce such shaking and impacts.

When the vehicle abnormally rises and the relative distance between upper surface plate 10 and rubber lower plate 30 reaches a prescribed value or more, wire 61 and fixing part 62 are pulled upward, thereby causing tension to be applied to wire 61. Furthermore, when pressurized air is excessively supplied and the relative distance between upper surface plate 10 and rubber lower plate 30 exceeds an allowable range, opening/closing member 72 connected to wire 61 with attachment 63 is pulled, under the tension of wire 61, toward the inside of space S2 in the hole axis direction of through hole 71. In this case, wire 61 is bent by wire routing member 65. Thus, when upper surface plate 10 rises, the tension acting in the direction along axis line P is applied to wire 61 located between fixing part 62 and wire routing member 65. Then, this tension is applied in the hole axis direction of through hole 71 that extends in the direction crossing the direction along axis line P. Thereby, plug member 73 is moved into closed space S in the hole axis direction, so that air discharge member 70 is brought into an opened state.

When air discharge member 70 is in an opened state, the pressurizing air that pushes up upper surface plate 10 inside closed space S can be discharged through the through hole 71. In this case, the pressurized air is continuously supplied by the above-described air supply member into closed space S, in which case the amount of air to be discharged by air discharge member 70 is greater than the amount of pressurized air to be supplied by this air supply member. Thereby, since the pressure inside closed space S can be reduced, upper surface plate 10 can be lowered until the relative distance between upper surface plate 10 and rubber lower plate 30 falls within an allowable range. When the relative distance between upper surface plate 10 and lower surface plate 20 is reduced, the tension applied to wire 61 is reduced. When the tension applied to wire 61 becomes smaller than the repulsive force of spring member 76, plug member 73 moves towards the outside of closed space S in the hole axis direction of through hole 71. Thereby, through hole 71 is closed by plug member 73, thereby bringing air discharge member 70 into a closed state. When air discharge member 70 is again brought into an opened state, holding member 75 moves towards closed space S in the hole axis direction in conjunction with plug member 73, thereby compressing spring member 76.

As described above, air spring 1 according to the first embodiment can detect a change of the relative distance between upper surface plate 10 and rubber lower plate 30 as a displacement of wire 61 routed between fixing part 62 provided in vehicle body side spigot 13 and opening/closing member 72 of air discharge member 70 provided on rubber lower plate 30. Accordingly, the abnormal height of the vehicle can be more directly detected. Furthermore, since wire 61 and the like constituting the detection unit are not mechanically connected to diaphragm 50, diaphragm 50 may not be deteriorated. Therefore, the maintenance of air spring 1 may not become complicated.

Furthermore, when the vehicle abnormally rises, one end of wire 61 connected to air discharge member 70 undergoes a prescribed displacement, and this displacement is transmitted as a mechanical output to air discharge member 70. Thereby, air spring 1 according to the first embodiment can discharge the air inside closed space S in response to the mechanical output. Accordingly, this air spring 1 is simpler in structure and system than the conventional air spring including an air discharge mechanism employing electrical processing.

Furthermore, air discharge member 70 is arranged within rubber stack 40 on rubber lower plate 30. Thereby, a detection unit and air discharge member 70 are provided in air spring 1 having basically the same structure as that of the existing air spring, with the result that air spring 1 according to the present embodiment can be configured without requiring a significant design change. In addition, in the case where air discharge member 70 is arranged within rubber stack 40, it is preferable that rubber stack 40 is placed in the direction in which this rubber stack 40 is less likely to move (this direction differs depending on the type of the vehicle) in consideration of the life of rubber stack 40.

Second Embodiment

Figure 4:
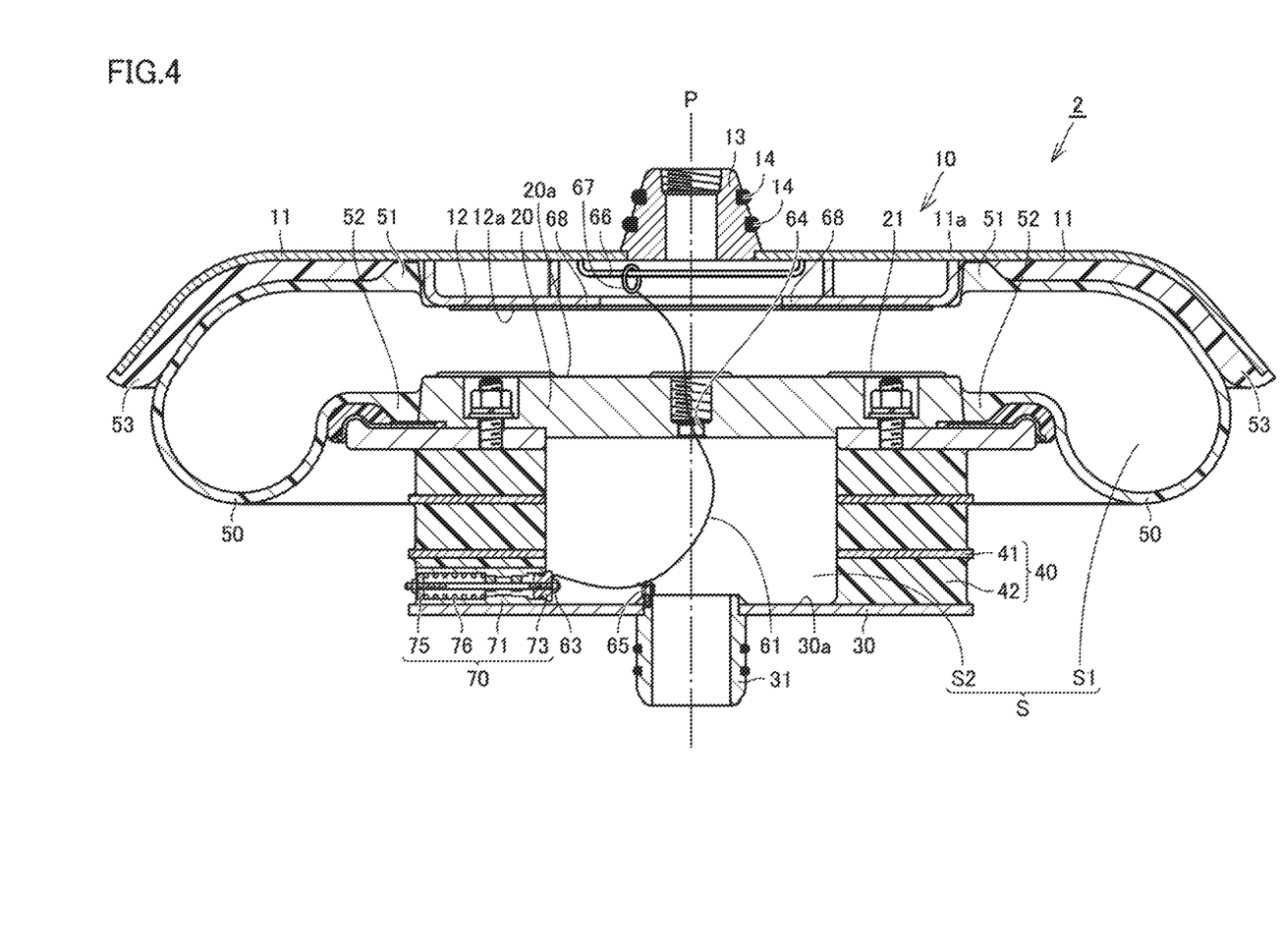
FIG. 4 is a cross-sectional view of an air spring according to the second embodiment.

Then, an air spring 2 according to the second embodiment will be hereinafter described with reference to FIG. 4. Although air spring 2 has basically the same configuration as that of air spring 1 according to the first embodiment, this air spring 2 is different from air spring 1 in that one end of wire 61 is connected not to fixing part 62 but to a hanging rod 66 provided on upper surface plate 10 through a ring-shaped member 67.

Hanging rod 66 is formed inside closed space S (for example, so as to include axis line P) in a prescribed direction perpendicular to the main load direction (for example, so as to extend from axis line P). Hanging rod 66 is provided so as to protrude from support plate 11 toward lower surface plate 20.

One end of wire 61 is fixed to ring-shaped member 67. Ring-shaped member 67 is formed in a ring shape having an inner diameter larger than the diameter of hanging rod 66. Hanging rod 66 passes through the inner circumferential side of this ring-shaped member 67. Thereby, ring-shaped member 67 is provided to be movable in the direction in which hanging rod 66 extends. Specifically, wire 61 is installed so as to extend from ring-shaped member 67 through lower surface plate through portion 64 provided in lower surface plate 20 and wire routing member 65 provided in carriage side spigot 31 to attachment 63.

By the configuration as described above, in the case where upper surface plate 10 moves in the direction perpendicular to the above-described main load direction relative to lower surface plate 20, and the case where the relative distance between upper surface plate 10 and lower surface plate 20 falls within an allowable range but reaches near its upper limit, tension occurs in wire 61, so that ring-shaped member 67 can be moved to the vicinity of axis line P. In other words, ring-shaped member 67 can be centered. Accordingly, even in the case where upper surface plate 10 and lower surface plate 20 move relative to each other in the direction perpendicular to the main load direction as described above, it becomes possible to reduce the proportion of the distance of the relative movement in the direction perpendicular to the main load direction that is included as a displacement of one end of wire 61 in the detection unit serving to detect an abnormal rise of the vehicle. Consequently, air spring 2 can achieve the same effect as that of air spring 1 according to the first embodiment, and also can more appropriately cope with an abnormal rise of the vehicle even in the case where the relative movement occurs in the direction perpendicular to the main load direction.

Then, referring to FIG. 4, a limitation member 68 will be hereinafter described. Limitation member 68 may be provided on upper surface plate 10 so as to protrude toward lower surface plate 20. Limitation member 68 may have an opening in the center portion including axis line P. By the configuration as described above, limitation member 68 can limit the movement width of wire 61 in the direction perpendicular to the main load direction on the upper surface plate 10 side relative to lower surface plate 20. Accordingly, air spring 2 can more appropriately cope with an abnormal rise of the vehicle.

Third Embodiment

Figure 5:
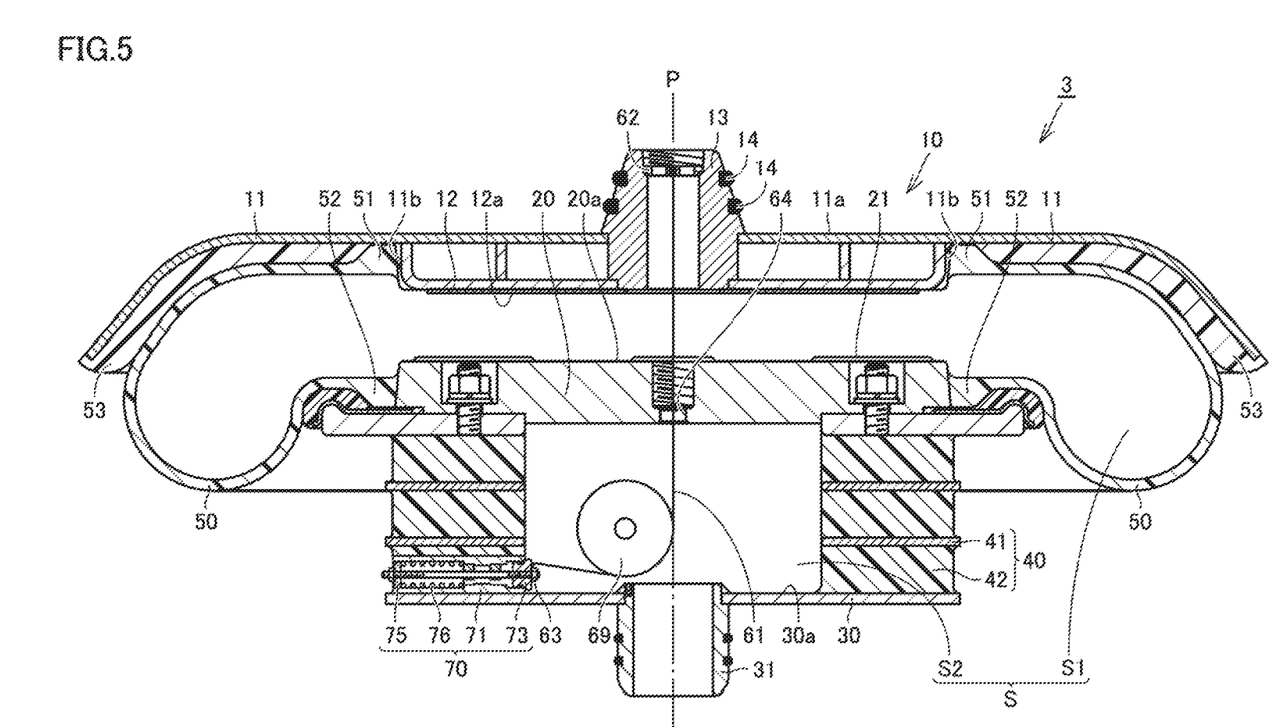
FIG. 5 is a cross-sectional view of an air spring according to the third embodiment.

Then, referring to FIG. 5, an air spring 3 according to the third embodiment will be hereinafter described. Air spring 3 according to the third embodiment has basically the same configuration as that of air spring 1 according to the first embodiment, but is different in that a reel 69 winding up wire 61 is provided in space S2.

Reel 69 is a spring-loaded reel, for example. Reel 69 is arranged in such a manner that wire 61 extending from fixing part 62 can be routed along axis line P. In this case, an urging force is accumulated in the spring of reel 69 also in the normal state (the state where the vehicle height falls within an allowable range). Accordingly, tension is continuously applied to wire 61. In other words, in the above-described normal state, even when upper surface plate 10 rises, the tension applied to wire 61 is maintained constant by the urging force accumulated in the spring of reel 69.

On the other hand, when the vehicle height abnormally rises beyond the allowable range, the relative distance between upper surface plate 10 and lower surface plate 20 increases, so that wire 61 undergoes tension more than the urging force accumulated in the spring of reel 69. In this case, this tension is reduced to accumulate an urging force in spring member 76 in air discharge member 70 fixed to the other end of wire 61, thereby bringing air discharge member 70 into an opened state. The pressurized air accumulated in the inside of closed space S of air spring 3 is discharged to the outside through the through hole 71 of air discharge member 70. When the pressurized air is sufficiently discharged, the relative distance between upper surface plate 10 and rubber lower plate 30 is reduced to thereby reduce the tension applied to wire 61, so that spring member 76 releases the force. Consequently, air discharge member 70 is brought into a closed state.

In this case, as described above, wire 61 extends along axis line P between fixing part 62 and reel 69. Accordingly, particularly when upper surface plate 10 rises along axis line P, the mechanical output can be more accurately and quickly transmitted to air discharge member 70, so that this air discharge member 70 can be opened and closed.

In this way, air spring 3 according to the third embodiment can achieve the same effect as that of air spring 1 according to the first embodiment, and also can more appropriately cope with an abnormal rise of the vehicle.

Fourth Embodiment

Figure 6:
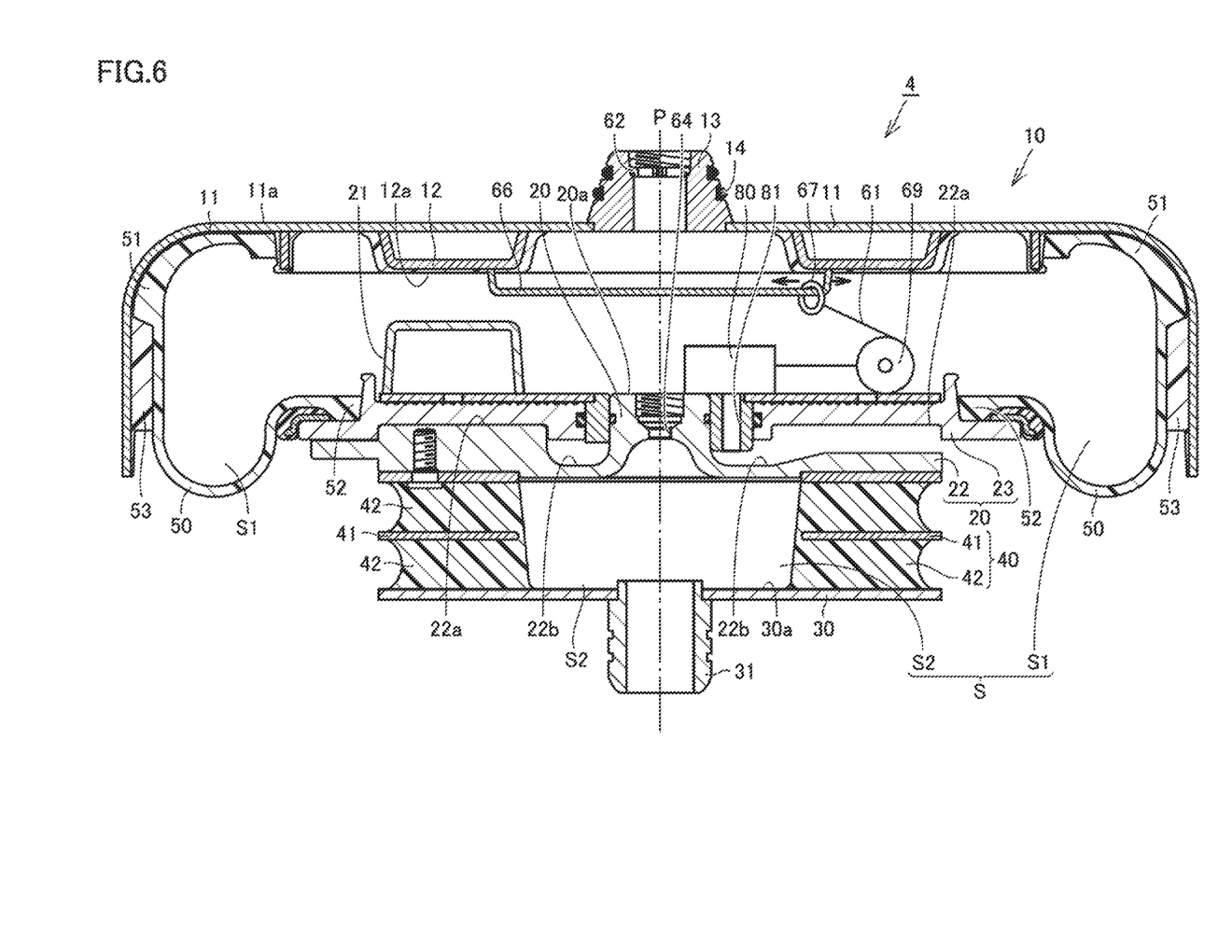
FIG. 6 is a cross-sectional view of an air spring according to the fourth embodiment.

Then, referring to FIG. 6, an air spring 4 according to the fourth embodiment will be hereinafter described. Air spring 4 according to the fourth embodiment has basically the same configuration as that of air spring 1 according to the first embodiment, but is different in that it includes a mechanical opening/closing valve 80 placed on lower surface plate 20 in place of air discharge member 70 and a through hole 81 provided in lower surface plate 20 and allowing communication between the inside and the outside of closed space S, and also different in that wire 61 is routed only inside space S1.

In the present embodiment, lower surface plate 20 is formed of a lower member 22 and an upper member 23 that are further connected to rubber stack 40. Lower member 22 includes a contact portion 22a that contacts upper member 23 and a spacer portion 22b for providing a space between this lower member 22 and upper member 23. This space is located outside air spring 4.

Mechanical opening/closing valve 80 is provided on lower surface plate 20 to be capable of opening and closing through hole 81. Through hole 81 is provided on lower surface plate 20 so as to allow communication between the inside and the outside of closed space S. Referring to FIG. 6, the end of through hole 81 on the rubber lower plate 30 side is connected to the space formed by spacer portion 22b between lower member 22 and upper member 23, and connected to the outside of air spring 4 through this space.

Hanging rod 66 is provided on upper surface plate 10. Also, ring-shaped member 67 to which one end of wire 61 is fixed is formed so as to be movable over hanging rod 66. Reel 69 winding up wire 61 is provided on lower surface plate 20. Reel 69 is a spring-loaded reel, for example. The other end of wire 61 is connected to mechanical opening/closing valve 80. Mechanical opening/closing valve 80 is in a closed state when the tension of wire 61 is less than a prescribed value, and is in an opened state when the tension of wire 61 is equal to or greater than the prescribed value.

In this case, as with air spring 3 according to the third embodiment, wire 61 undergoes tension also in the normal state (mechanical opening/closing valve 80 is in a closed state). When the vehicle height further abnormally rises beyond the allowable range, the relative distance between upper surface plate 10 and lower surface plate 20 is increased, so that wire 61 undergoes tension more than that may be accumulated in the spring of reel 69. In this case, in order to reduce this tension, the other end of wire 61 moves toward reel 69, thereby bringing mechanical opening/closing valve 80 into an opened state. As a result, the pressurized air supplied into closed space S is discharged from through hole 81 through the above-described space formed by lower member 22 and upper member 23. Thereby, the same effect as that achieved by air spring 1 according to the first embodiment can be achieved. In addition, when the abnormal height of the vehicle is returned to its original height by discharging air through mechanical opening/closing valve 80, the tension of wire 61 is reduced, thereby bringing mechanical opening/closing valve 80 into a closed state.

Furthermore, reel 69 may only be provided in any position on lower surface plate 20. For example, in the case where upper surface plate 10 and lower surface plate 20 move relative to each other in an unbalanced manner in one direction, reel 69 may be provided at a position distant from axis line P on lower surface plate 20, as shown in FIG. 6. In this case, in the state where upper surface plate 10 and lower surface plate 20 do not move relative to each other in the direction perpendicular to the main load direction, ring-shaped member 67 is located at the outermost circumferential portion of hanging rod 66, for example, as seen from axis line P. Also in this way, when upper surface plate 10 moves relative to lower surface plate 20 in the direction perpendicular to the main load direction, wire 61 undergoes tension, so that ring-shaped member 67 can be moved to the vicinity of reel 69. Accordingly, even in the case where upper surface plate 10 and lower surface plate 20 move relative to each other in the direction perpendicular to the main load direction as described above, it becomes possible to reduce the proportion of the distance of the relative movement in the direction perpendicular to the main load direction that is included as a displacement of one end of wire 61 in the detection unit serving to detect an abnormal rise of the vehicle. Thereby, the abnormal rise of the vehicle can be more appropriately addressed.

In each of the first to third embodiments, the region of air discharge member 70 in which through hole 71 and plug member 73 are in surface contact with each other is provided along the hole axis direction of through hole 71, but is not limited thereto.

Figure 7:
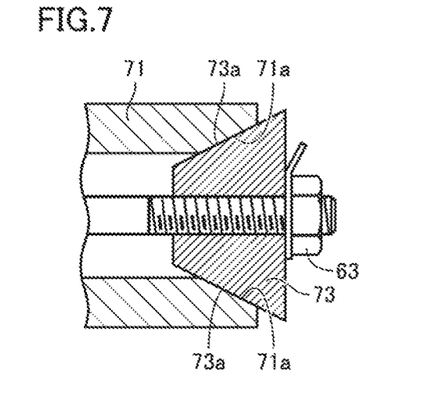
FIG. 7 is a cross-sectional view showing a modification of a plug member 73 of opening/closing member 72 shown in FIG. 2.

Referring to FIG. 7, it is preferable that an outer circumferential surface portion 73a provided in plug member 73 and coming in contact with through hole 71 is formed in a tapered shape as the first tapered portion. Furthermore, it is preferable that an inner circumferential surface portion 71a provided in through hole 71 and contacting plug member 73 is formed in a tapered shape as the second tapered portion.

By the configuration as described above, through hole 71 can be opened and closed by slight movement of plug member 73 in the hole axis direction of through hole 71, so that the opening/closing operation can be quickly performed. Furthermore, during the opening/closing operation, through hole 71 and plug member 73 can be readily positioned coaxially with each other.

Figure 8:
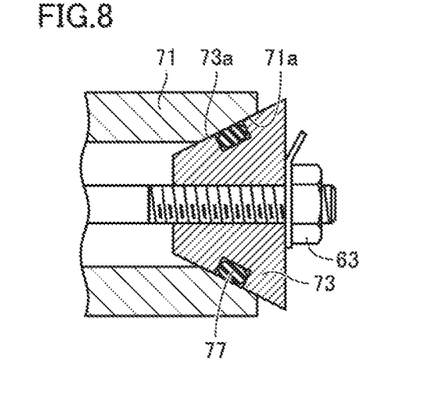
FIG. 8 is a cross-sectional view showing another modification of plug member 73 of opening/closing member 72 shown in FIG. 2.

Further referring to FIG. 8, outer circumferential surface portion 73a provided in plug member 73 and coming in contact with through hole 71 may be formed in a tapered shape and also provided with an O ring 77. By the configuration as described above, the airtightness of closed space S formed inside each of air springs 1, 2 and 3 can be further enhanced.

Although the embodiments according to the present invention have been described as above, the above-described embodiments can also be variously modified. Also, the scope of the present invention is not limited to the above-described embodiments. The scope of the present invention is defined by the terms of the claims, and is intended to include any modifications within the meaning and scope equivalent to the terms of the claims.

INDUSTRIAL APPLICABILITY

The present invention is particularly advantageously applicable to an air spring for a railroad vehicle.

REFERENCE SIGNS LIST

1, 2, 3, 4 air spring, 10 upper surface plate, 11 support plate, 11a upper surface, 11b, 21a circumferential surface, 12, 21 slide member, 12a, 20a main surface, 13 vehicle body side spigot, 14 O ring, 20 lower surface plate, 30 rubber lower plate, 30a support surface, 31 carriage side spigot, 40 rubber stack, 41 hard layer, 42 elastic layer, 50 diaphragm, 51 upper surface plate contact portion, 52 lower surface plate contact portion, 53 buffer portion, 61 wire, 62 fixing part, 63 attachment, 64, lower surface plate through portion, 65 wire routing member, 66 hanging rod, 67 ring-shaped member, 68 limitation member, 69 reel, 70 air discharge member, 71, 81 through hole, 71a inner circumferential surface portion, 72 opening/closing member, 73 plug member, 73a outer circumferential surface portion, 74 center shaft, 75 holding member, 76 spring member, 77 O ring, 78 fixing nut, 79 guide member, 80 mechanical opening/closing valve, P axis line, S closed space, S1, S2 space.

The invention claimed is:
1. An air spring comprising:
a first supporting member;
a second supporting member arranged to be spaced away from the first supporting member in a main load direction;
an elastically deformable diaphragm forming a closed space by connecting the first supporting member and the second supporting member;
a detection unit detecting a change of a relative distance between the first supporting member and the second supporting member without contacting the elastically deformable diaphragm, and producing a mechanical output of the change of the relative distance; and
a controlling member capable of discharging air in an inside of the closed space to an outside of the closed space in response to the mechanical output from the detection unit, wherein
the detection unit includes a wire routed between the first supporting member and the second supporting member, and
the mechanical output corresponds to a displacement of one end of the wire.

2. The air spring according to claim 1, wherein the controlling member includes a through hole allowing communication between the inside and the outside of the closed space, and an opening/closing member capable of opening and closing the through hole.

3. The air spring according to claim 2, wherein the opening/closing member has a plug member configured to be movable relative to the through hole by the mechanical output.

4. The air spring according to claim 3, wherein
the plug member has a first tapered portion formed in a tapered shape, and
the through hole has an inner circumferential surface including a second tapered portion that is in surface contact with the first tapered portion of the plug member in a state where the opening/closing member closes the through hole.

5. The air spring according to claim 1, wherein
the second supporting member includes an elastic member, and
the controlling member is provided in the elastic member.

* * * * *